United States Patent [19]

Harris

[11] 4,380,072
[45] Apr. 12, 1983

[54] XUV LASER AND METHOD

[75] Inventor: Stephen E. Harris, Palo Alto, Calif.

[73] Assignee: Stanford University, Palo Alto, Calif.

[21] Appl. No.: 218,781

[22] Filed: Dec. 22, 1980

[51] Int. Cl.$^3$ .............................................. H01S 3/094
[52] U.S. Cl. ........................................... 372/5; 372/91
[58] Field of Search ................................ 372/5, 91, 70

[56] References Cited

PUBLICATIONS

Mani et al., "Lithium–ion soft X–ray Laser", *Journal of Applied Physics*, vol. 47, No. 7, Jul. 1976, pp. 3099–3106.
Mahr et al., "Use of Metastable Ions for a Soft X–Ray Laser" *Optics Communications*, vol. 10, No. 3, Mar. 1974, pp. 227–228.
McGuire, "The L–MM Auger Spectra of Na and Mg+", *Physical Review A* vol. 14, No. 4, Oct. 1976, pp. 1402–1410.
McGuire et al., "Soft X–Ray Gain in the Alkali Earths,", *Applied Optics*, vol. 16, No. 1, Jan. 1977.
Willison et al., "Emission Spectra of Core Excited Even–Parity $^2$P States of Neutral Lithium", *Physical Review Letters*, vol. 44, No. 17, Apr. 28, 1980, pp. 1125–1128.

*Primary Examiner*—James W. Davie
*Attorney, Agent, or Firm*—Flehr, Hohbach, Test, Albritton & Herbert

[57] ABSTRACT

The method of generating XUV radiation which involves exciting atoms to a storage level, irradiating the excited atoms and raising them to a higher level and allowing the atoms to lase to a lower level other than ground which is simultaneously emptied.

12 Claims, 5 Drawing Figures

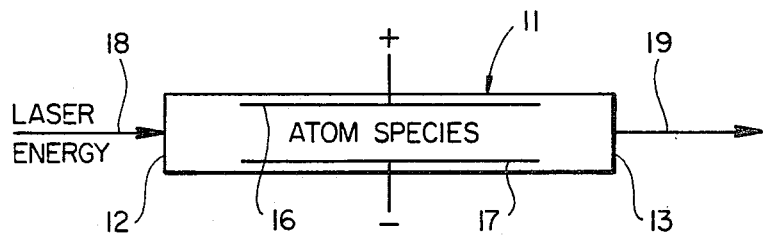
FIG__1
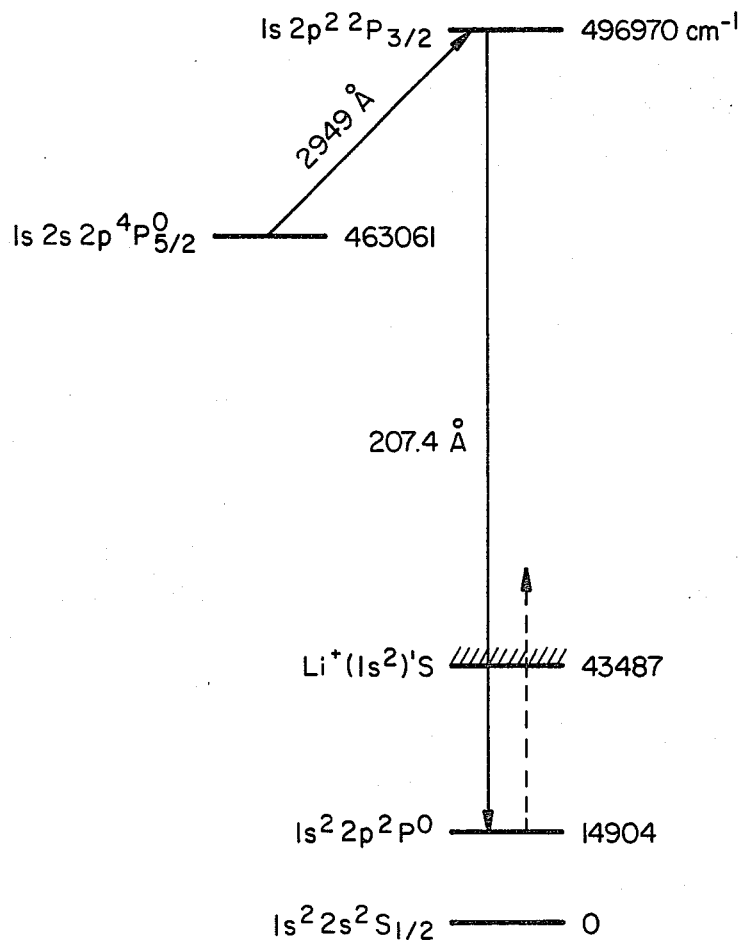
FIG__2

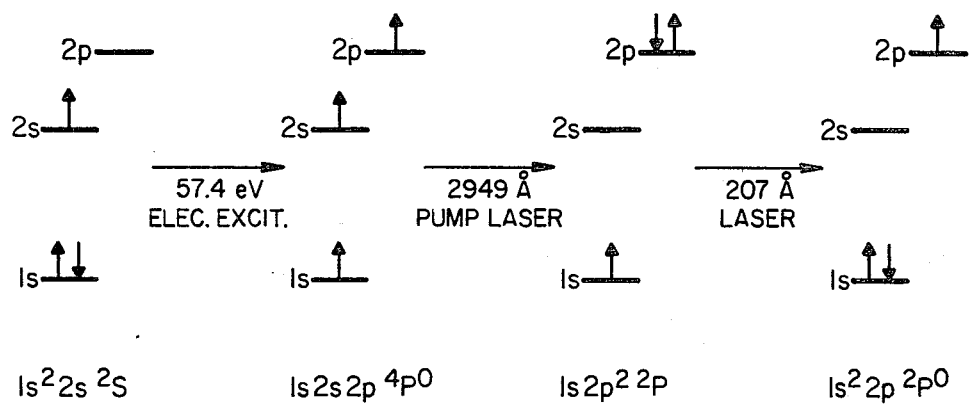
FIG_3
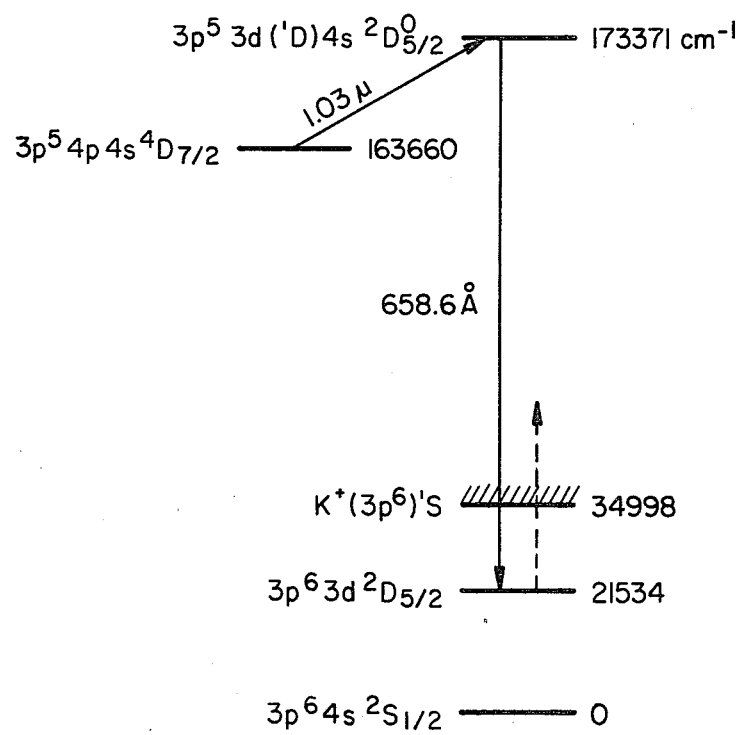
FIG_4

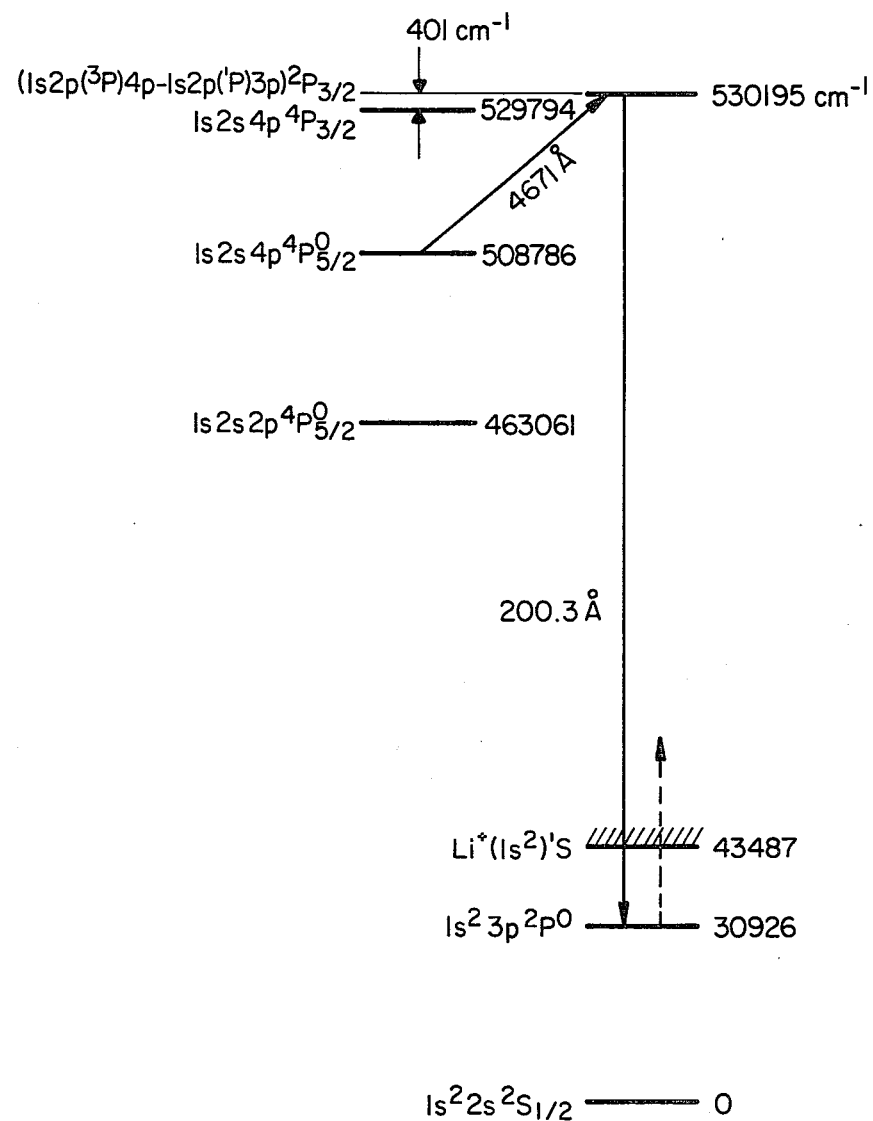
FIG_5

XUV LASER AND METHOD

The invention was developed under ONR Contract N00014-78-C-0403.

This invention relates generally to an extreme ultraviolet (XUV) laser and method.

It has been recognized that a key problem in obtaining a short wavelength laser is the very short spontaneous lifetime of atomic states in this region of the electromagnetic spectrum. In March 1974, H. Mahr and U. Roeder in *Optics Communications*, Volume 10, No. 3, proposed that a possible solution to this problem would be to store energy in a metastable level of an ion and then use an intense laser to transfer this energy into a lasing level where the species lases to the ground state. The key difficulty with this proposal is that in order to invert the upper state of the lasing species with regard to the ground state one must first invert the storage level ions with respect to their ground state. This is believed to be a very difficult process.

It is a general object of the present invention to provide an XUV laser in which the metastable state is selected so that it can be achieved without inverting with respect to ground.

In accordance with the present invention, energy is stored in the quartet metastable level of the neutral atom where autoionization and radiation is minimum. The excited atoms are then transferred to a higher atomic level by an exciting laser where they can then lase. The second level is selected to be metastable against autoionization. The atom species then lases to a lower laser level other than ground.

The lower level is emptied into the continua by the exciting laser or by another laser.

The foregoing and other objects of the invention will be more clearly understood from the following figures and description.

FIG. 1 shows a laser in accordance with one embodiment of the present invention.

FIG. 2 shows the energy level diagram for a lithium laser in accordance with one embodiment of the present invention operating at 207A.

FIG. 3 is a diagram showing the configuration and spin at the energy levels shown in the diagram of FIG. 2.

FIG. 4 shows the energy level diagram for potassium laser in accordance with the present invention operating at 658.6 Å

FIG. 5 shows the energy level diagram for a lithium laser operating at different energy levels and lasing at 200.3 A.

A laser in accordance with the present invention is shown in FIG. 1. The laser includes an envelope 11 having end windows 12 and 13. The envelope contains the lasing atom species at suitable pressure. For example, a lithium lasing species may be introduced into the evacuated envelope by vaporization at high temperature. The lithium atom density may be about $10^{16}$ atoms/cm$^3$. Means for exciting the atoms for purposes to be presently described may comprise a pair of spaced plates 16 and 17 between which is applied a voltage which causes a discharge within the envelope to excite the atoms and raise them from the ground state. A suitable exciting laser is focused into the envelope to further excite the atoms within the envelope. This is schematically represented by the arrow 18 impinging upon the window of 12. Output from the lasing species within the envelope is obtained at the window 13 and indicated by the arrow 19.

Operation of the laser shown in FIG. 1 may be more clearly understood with reference to the energy level diagram shown in FIG. 2 and the change in electron configuration and spin involved during operation illustrated in FIG. 3.

Referring to the drawings, ground state atoms $1s^22s^2S$ are excited by electron excitation and energy is stored in the $1s2s2p^4P^0$ level. The electron excitation is achieved by the discharge described in connection with FIG. 1 or, for example, by the use of heating the atoms with high peak power microwave radiation in the presence of a longitudinal magnetic field, the magnetic field being adjusted so that electron excitation frequency is larger than the microwave frequency thereby insuring that the plasma dielectric constant remains real. By way of example, other types of electrical discharges for excitation include pulse hollow cathode discharges, laser heated discharges, microwave discharges and the theta-pinch plasmas. It suffices to say that the requirement is that the excitation be such as to excite the electrons from ground state to the $1s2s2p^4P^0$ level. This level is the lowest of the quartet series and is stable against both autoionization and radiation. Its fine-structure components, $J=\frac{1}{2}, 3/2, 5/2$ are separated by about 1 cm$^{-1}$ and have experimentally measured lifetimes of 0.14, 0.46 and 5.8 microseconds respectfully. This level may be populated not only by direct electron excitation but also by radiating cascades from all higher levels in the quartet series and by recombination. The electron excitation, 57.4 eV, is shown as exciting the outer shell electron, second column of FIG. 2, from the lower 1s level to the 2p level.

The second step of excitation is to use an intense laser pump in this example at a wavelength of 2949 Å to transfer the 2s electron to a 2p level and also to flip its spin thereby rapidly populating the radiatively allowed $1s2p^2$ $^2P$ level. This higher level is metastable against autoionization but is strongly radiatively allowed and may lase to a transition level other than ground. This stability against autoionization results from a combination of parity and angular momentum selection rules. By parity the ejected electron must be s or d and thus the end product must have a total angular momentum (ion plus electron), that is, S or D. The initial momentum is P, and therefore autoionization is not allowed.

This level decays radiatively and emits 207 Å ultraviolet light. Reference to FIG. 2 shows that this level lases to the lower $1s2p^2P^0$ level. This lasing action is shown in FIG. 3 by one of the 2p level electrons dropping into the $1s^22p^2P^0$ level.

In accordance with another feature of the invention, it is desirable to empty the terminal laser level $1s^22p^2P^0$ level. This can be achieved by the same pump laser which has a wavelength that is sufficiently short to photoionize this level and thereby ionize this level into the continua as illustrated by the dotted arrow, FIG. 2. It is, of course, also possible to use a separate laser to cause photoionization of this level into the continua, or perhaps into a high Rydberg level near the continua.

FIG. 4 shows the energy level diagram for potassium. The lifetime of the potassium at the quartet level, $3p^54p4s^4D_{7/2}$, is approximately 90 $\mu$s. The species is brought to the quartet level by suitable excitation as, for example, by a discharge electric field or microwave energy. The atoms are raised to the lasing level, $3p^53d('D)4s$ $^2D_{5/2}^0$, by means of a high intensity laser operating at 1.03 microns. The species lases at 658.6 Å to the $3p^63d^2D_{5/2}$ level. Photoionization serves to empty this level into the continua.

A lithium laser may be operated at 200.3 Å as shown in the energy level diagram of FIG. 5.

The lasing technique described is based upon at least a partial breakdown of the LS coupling, thereby allowing transfer on the intercombination line connecting the quartet to the doublet series. For low levels of light atoms such as lithium, the breakdown of LS coupling is small and laser power densities of about $10^{10}$ watt/cm$^2$ are required to complete transfer in a time short compared to the spontaneous emission time.

There are two ways to increase the breakdown of LS coupling and to thereby reduce the necessary laser power density for transfer. The first is to work in heavier atoms such as potassium which has a larger coulombic gradient and therefore a larger spin orbit matrix element. The second is to use a storage level which is somewhat higher in the quartet manifold and to thereby make use of smaller energy denominators between appropriate levels in the quartet and doublet series.

Either of these approaches have several additional effects. Most important is that the breakdown of LS coupling allows admixing of terms in the doublet series. This, in turn, may allow autoionization of the upper laser level thereby reducing the gain cross section and requiring the population transfer to take place in a shorter time. Also, to the extent that long storage times are desired, one may only use those quartet levels which have the maximum value of J for a particular configuration. Irrespective of the breakdown of LS coupling, these levels are pure quartets and should not ionize coulombically.

Although energy level diagrams have been shown for only lithium and potassium, other alkali atoms are useful in the system of the present invention. For example, rubidium and sodium can be used. In both cases the lower level will be the lowest level in the quartet manifold. Operation will be as described. In addition, certain ions can be used. These are the ions of the isoelectronic sequence since they are an extension to the equivalent three electron system and would operate in the same manner. One example would be a beryllium ion, Be$^+$.

Thus there has been provided a laser for generating XUV radiation.

What is claimed is:

1. The method of generating XUV radiation which comprises exciting alkali metal atoms or ions of the isoelectronic sequence to a storage level which is metastable against both autoionization and radiation, pumping by irradiating with a laser the excited atoms to a higher level which is metastable against autoionization but is strongly radiatively allowed to lase to a lower level other than ground and simultaneously emptying said lower level, both radiatively and by photoionization into the continua or to a level near enough to the continua, that electrons complete the emptying process.

2. The method of claim 1 in which said metal atoms are lithium atoms.

3. The method of claim 1 in which said metal atoms are potassium atoms.

4. The method of claim 1 in which said metal atoms are sodium atoms.

5. The method of claim 1 in which said metal atoms are rubidium atoms.

6. The method of claim 1 in which said ions are beryllium ions.

7. The method of claim 1 in which the lower level is emptied by pumping radiation.

8. The method of claim 1 in which the lower level is emptied by a second laser.

9. The method of claim 1 in which the atoms or ions are excited by a discharge.

10. The method of claim 1 in which the atoms or ions are excited by microwave radiation.

11. The method of claim 1 in which the metal atoms are lithium and the atoms are excited to the $1s2s2p4P^0_{5/2}$ level.

12. The method of claim 1 in which the metal atoms are lithium and the atoms are excited to the $1s2s4p^4P^0_{5/2}$ level.

* * * * *